Oct. 14, 1952  L. L. MOORE  2,613,814
FILTER
Filed April 19, 1948
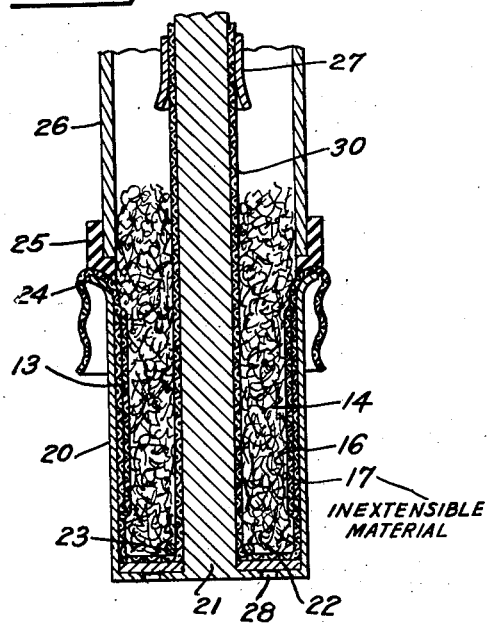
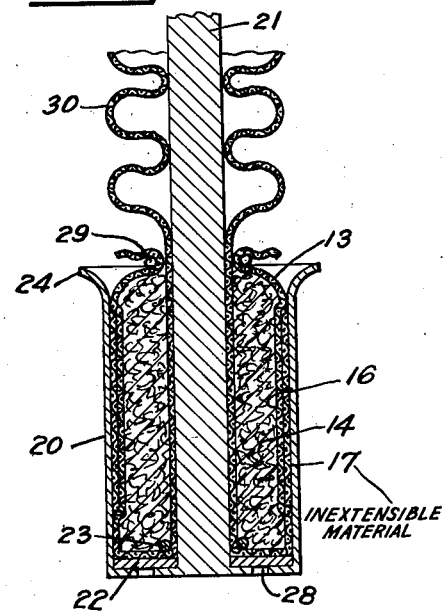
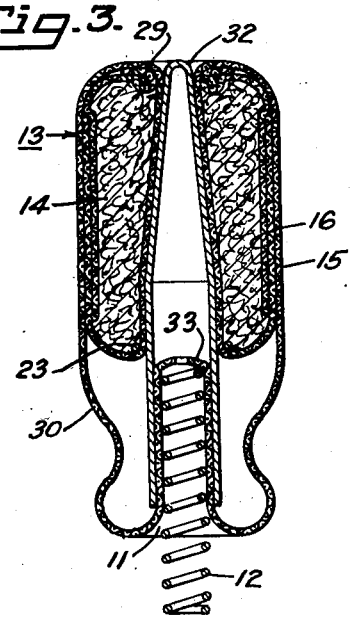
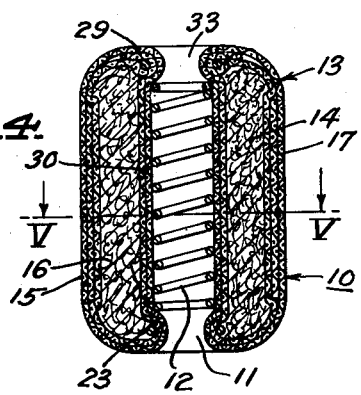
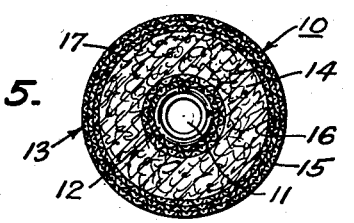
INVENTOR.
LAURENCE L. MOORE
BY
ATTORNEY Patented Oct. 14, 1952

2,613,814

UNITED STATES PATENT OFFICE 2,613,814

FILTER

Laurence L. Moore, Oakland, Calif., assignor to Winslow Engineering Co., Oakland, Calif., a partnership Application April 19, 1948, Serial No. 21,900

4 Claims. (Cl. 210—148)

This invention relates to improvements in an apparatus for oil filtering. More particularly, this invention relates to an improved oil-filtering cartridge. Still more specifically, the invention relates to an improvement in a knitted sock type of oil filtering cartridge in which a stiffening member of porous or perforated, substantially inextensible material, is employed to prolong the life and enhance the efficiency of the cartridge.

Knitted sock cartridges such as described in the patent to myself and Charles A. Winslow, No. 2,314,640, have proved very satisfactory in most respects. However, after some of the largest sizes of these filter cartridges have been in heavy duty use in certain types of service, they sag down when an excessive weight of sludge is collected in the cartridge. When the cartridge is loaded beyond normal dirt capacity and used in service where vibration or jolting tends to jar and sag the cartridge down in the filter, there is danger of the cartridge swelling and shortening, thus losing its end seal. In this case, the oil being filtered could by-pass the top of the filter and thereby flow to the filter outlet without passing through the filter material.

Various means have been employed to correct this problem with knitted sock cartridges, but due to the nature of the filter material and the flexibility of the knitted covering, in some cases, they have not been entirely successful.

Substitutes for knitted material have been used at various times, but have not proven satisfactory. Woven material interferes with the free flow of liquid, unless the openings between the threads are so wide that the loosely woven material develops the same objectionable characteristics as knitted materials. Among other materials used to form a casing for filter media have been perforated cardboard, fibreboard, etc. These casings, while possessed of sufficient rigidity to resist deformation, had a limited filter capacity. This limited capacity was due to the insufficient number and small size of the perforations which were allowable in the tubular cardboard sections of the filter. The size of the openings was a particularly undesirable shortcoming because it could not be altered very much without danger of losing filter media. Thus, the dilemma has been the choice between the advantages of a free-flowing knitted outer sock which can sag, and a cartridge which will not sag but is also not free-flowing nor possessed of the other advantages of a knitted-sock type of cartridge.

One object of this invention is to provide a sock type filter which will not become deformed so long as it is in use.

Another object of the invention is to provide a sock type filter in which there is incorporated a stiffening member which does not interfere with the free-flowing characteristics of the filter.

Another object of the invention is to provide a free-flowing stiff cartridge with satisfactory sediment-removing characteristics.

Another object of the invention is to provide a sock-type filter having a double outer layer of knitted fabric in between which is a layer of stiff, porous, or perforated, substantially inextensible material.

Other objects and advantages of the invention will appear from the course of the following description, given as a preferred embodiment in conformity with U. S. Revised Statutes Section 4888, without intent to limit the invention otherwise than as required by the claims.

Referring to the accompanying drawing:

Fig. 1 is a vertical sectional view illustrating the first stages of stretching the flexible knitted material over and into a casing containing the reinforcing girdle, for loading the filter ingredients in the proper form;

Fig. 2 is a vertical sectional view of the second stage wherein the filtering and purifying ingredients are shown compressed in the porous flexible knitted casing which is held in proper form by a metal container and central stud arrangement;

Fig. 3 is a vertical sectional view of the novel element illustrating the third stage of its construction showing the knitted casing about to be forced into the second folding operation and locked in place with the wire coil spacer, with the reinforcing fluid-permeable girdle in position between the two outer plies of the cartridge;

Fig. 4 is a vertical sectional view of the finished element in its preferred form; and Fig. 5 is a horizontal sectional view of the novel element taken on the line V—V of Fig. 4.

In general the product of this invention provides a free-flowing sediment-removing sock-type filter cartridge of the type having a two-ply knitted casing, and comprises the combination with this cartridge of a stiffening girdle between the two outer layers, the girdle being constructed of fluid-permeable, substantially inextensible material. The improved construction is preferably formed by a method comprising the steps of: (1) compacting a predetermined quantity of a suitable filtering material into a tubular fabric casing which is capable of expanding transversely while maintaining a hollow space centrally through the cartridge, the filled portion of the casing being surrounded by a permeable and substantially inextensible cylindrical girdle; (2) folding and stretching a portion of the tubular casing back over the portion containing the compacted material to provide a multi-ply covering while holding the tube at a fold, at one end of the cartridge, the girdle being included between the outer plies while folding the fabric; and (3) placing in the hollow center of the filtering material a radially-rigid support to prevent collapse of the central casing into the hollow space.

The preferred form of embodiment of the filter cartridge 10 is shown in Figs. 4 and 5, while Figs. 1-3 show stages in a preferred method of manufacturing this cartridge.

As shown in Figs. 4 and 5, the preferred filter cartridge 10 is annular in shape, the usual direction of flow being from the outside towards the hollow center 11, in which is a stiffening spring 12 to keep the cartridge 10 stretched tightly. The cartridge 10 comprises a toroidal casing 13 filled with porous filtering material 14. The casing 13 is made from expansible, knitted fabric, and the casing wall is two ply. Between the outer ply 15 and the inner ply 16 of the outside wall is located the stiffening member or girdle 17. This stiffening member 17 comprises a substantially inextensible, permeable, cylindrical sleeve which extends substantially the height of the cartridge. Many different types of material are suitable for use in the girdle 17. Where metals can be used, the girdle may be made of a wire screen. Stiff fibreboard or cardboard is satisfactory when perforated by a large number of openings sufficiently large not to restrict flow of a liquid. A coarse canvas is suitable if it is sufficiently stiff.

It should be noticed that this stiffening member when combined with sock-type of cartridge gives advantages which could not be obtained either with a filter made entirely from knitted fabric or from a filter made entirely of the stiffening material. Thus, for example, the passages through the girdle 17 may be much larger than they could be if the girdle materials were the sole outer casing 13, so that many material not suitable for an outer casing are satisfactory for the girdle. Moreover, the cost is substantially reduced over the type of filter made from canvas, for example, both because of the cheapness of the outer knitted material and because of the difficulty in forming the sock from stiff canvas. At the same time the new cartridge has advantages over the cardboard or canvas filters in being more free-flowing and over the former knitted casing cartridges in being able to retain its form.

Fig. 1 shows the first stages of the preferred method of forming the cartridge or element 10 and filling it with the filtering material 14. The porous, knitted tube 13 of fabric is to be held in position for loading inside the hollow, metal cup-like form 20 and around the central stud 21, which preferably is attached to the bottom of the form 20.

First, the washer 22 is placed in the bottom of the cup 20 around the stud 21, and then the girdle 17 is positioned in the cup 20 against its wall. The preferred method of positioning the cloth tube 13 is to slip a predetermined length of cloth down over the stud 21, reverse it at the bottom of the cup 20, and place the small snap spring ring 23 on over the stud 22 and fabric 13 to hold the fabric to the stud at the bottom. Then the fabric 13 is drawn up inside the girdle or sleeve 17 and over the upper edge 24 of the cup 20, where it is clamped in place by the rubber ring 25. Thus, when viewed in section, the fabric tubing 13 is formed as a W with the center 30 ordinarily raised more than twice the height of the cup 20.

The loading tube 26 is then placed on the rubber clamping ring 25, and the ring clamping means 27 holds the upper end of the fabric tube 13 firmly to the stud 21. Filtering and purifying materials 14 are now loaded into the open upper end of the tube 26 and compressed down into the cup 20 by a hollow ram, which is not shown. The perforations 28 around the lower end of the cup 20 permit the escape of air when the material 14 is compressed in the cup 20.

As the compressed material 14 is forced into the cup 20 it naturally forms the fabric 13 into an elongated doughnut form. As this is done the sock 13 is permitted to draw in between the clamping surfaces just sufficiently to bring about the desired tension in the fabric 13. After a predetermined amount of filtering material 14 has been loaded and compressed into the sock 13 the clamping ring 25 and tube 26 are removed.

In Fig. 2, the purifying materials 14 are shown loaded and compressed into the sock 13 held in the cup 20. The clamping rings 25 and 27 have been removed and a second snap ring 29 has been placed near the top to clamp both the outside and inside fabric tubing 13 to the center stud 21. The upper loose portion 30 of the fabric tubing 13 is now reversed and drawn down over the flared edge 24 of the cup 20.

At this time kick-out pins (not shown) are inserted through the perforations 28 in the bottom of the cup 20 and are forced up against the washer 22, thus lifting the element 10 up and out of the cup 20. This draws in tension the second layer 30 of folded fabric down over the outside of the hollow tubular girdle 17.

In Fig. 3, the third stage of forming the element 10 is shown. One thickness of fabric 13 is on the inside and two thicknesses are on the outside, with the girdle 17 between the latter two. The hollow tapered pin 32 is then inserted in the hollow center 11 of the cartridge 10. As shown in Fig. 3, the pin 32 is part way through the element. The loose end 33 of the fabric is tucked into the inside and held in place by the coil spring-like spacer 12. As the hollow pin 32 and the spring 12 are forced upwardly, the fabric is drawn up in tension through the core 11 of the element 10, and the girdle 17 is enclosed tightly in the envelope of knitted fabric 13.

In Fig. 4, the next and final stage of the element is shown. The hollow pin 32 has completely passed through and out of the element 10, causing the fabric 13 to be drawn through in tension and covering the purifying material 14 with two thicknesses of fabric on the inside and a threefold covering outside. As the hollow pin 32 was drawn through, the lower constricting snap ring 23 opened to permit the free passage of the fabric 13 and the spring-spacer coil 12. When the hollow pin 32 was withdrawn through the upper snap ring 29, the inner fabric tubing covering 13 on the spring 12 reached the limit of its upward travel, thereby retarding and stopping the spring 12, between the constricting rings 23 and 29. The coil spacer spring 12 then serves to keep the element 10 in shape, both longitudinally and horizontally.

In Figs. 4 and 5, the element 10 is shown covered on the exterior with two thicknesses of expanded fabric material 13, between which is held the girdle 17, and with two thicknesses of compressed fabric on the inside. The constricting rings 23 and 29 effectively constrict both ends of the element to a lesser diameter than the inside diameter of the coiled spacer spring 12 so that the element 10 will seal on both ends of the hollow outlet tube of a filter, when the cartridge 10 is installed in a filter housing.

I claim:

1. In a filter cartridge of the type in which there is a core of fibrous filtering material having an aperture extending therethrough, annular retainer members positioned adjacent the respective ends of said core aperture, a unitary tubular sheath of extensible material encircling said core in a plurality of continuous toroidal convolutions and passing through said core aperture, and means within said core aperture for holding said sheath in engagement with said annular retaining members; the combination therewith of a fluid-permeable, substantially inextensible, cylindrical girdle between two of the outside convolutions of said sheath.

2. The combination claimed in claim 1, in which said girdle is made from substantially inextensible woven cloth.

3. The combination claimed in claim 1, in which said girdle is made from cardboard having perforations in its circumference.

4. The combination claimed in claim 1, in which said girdle is made from wire screen.

LAURENCE L. MOORE.

REFERENCES CITED

The following references are of record in the file of this patent:

UNITED STATES PATENTS

| Number | Name | Date |
|---|---|---|
| 2,314,640 | Winslow et al. | Mar. 23, 1943 |
| 2,335,532 | Ream | Nov. 30, 1943 |
| 2,362,530 | Bennett | Nov. 14, 1944 |
| 2,369,857 | Russell et al. | Feb. 20, 1945 |
| 2,394,895 | Burhans | Feb. 12, 1946 |
| 2,463,137 | Bahlke | Mar. 1, 1949 |
| 2,464,870 | Kamrath | Mar. 22, 1949 |
| 2,511,292 | Myers | June 13, 1950 |